United States Patent
Tang et al.

(10) Patent No.: US 11,479,701 B2
(45) Date of Patent: Oct. 25, 2022

(54) THERMAL CONDUCTION ENHANCED ORGANIC COMPOSITE SHAPE-STABILIZED PHASE CHANGE MATERIAL AND PREPARATION METHOD THEREOF

(71) Applicant: DALIAN UNIVERSITY OF TECHNOLOGY, Liaoning (CN)

(72) Inventors: Bingtao Tang, Liaoning (CN); Xiaoqiao Fan, Liaoning (CN); Yuang Zhang, Liaoning (CN); Rongwen Lv, Liaoning (CN); Shufen Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 352 days.

(21) Appl. No.: 16/619,070

(22) PCT Filed: Jun. 7, 2018

(86) PCT No.: PCT/CN2018/090184
§ 371 (c)(1),
(2) Date: Dec. 3, 2019

(87) PCT Pub. No.: WO2019/104987
PCT Pub. Date: Jun. 6, 2019

(65) Prior Publication Data
US 2020/0095489 A1 Mar. 26, 2020

(30) Foreign Application Priority Data
Nov. 28, 2017 (CN) .......................... 201711215584.4

(51) Int. Cl.
*C09K 5/06* (2006.01)
*C09K 5/14* (2006.01)

(52) U.S. Cl.
CPC ................ *C09K 5/063* (2013.01); *C09K 5/14* (2013.01)

(58) Field of Classification Search
CPC ................................. C09K 5/063; C09K 5/14
USPC .......................................................... 252/75
See application file for complete search history.

(56) References Cited

U.S. PATENT DOCUMENTS

| | | | |
|---|---|---|---|
| 4,470,917 A | 9/1984 | Hawe et al. | |
| 9,808,964 B2 * | 11/2017 | Sakamoto | B01J 35/10 |
| 10,221,323 B2 * | 3/2019 | Lentz | C09D 133/00 |
| 10,316,199 B2 * | 6/2019 | Lentz | C09D 5/14 |
| 11,091,661 B2 * | 8/2021 | Wu | D21H 17/74 |
| 2014/0170350 A1 * | 6/2014 | Sakamoto | C04B 35/624 428/221 |
| 2016/0123009 A1 * | 5/2016 | Ayambem | B32B 27/20 252/73 |
| 2016/0168439 A1 * | 6/2016 | Ayambem | C08J 3/126 428/484.1 |
| 2018/0009996 A1 * | 1/2018 | Lentz | A01N 59/20 |
| 2020/0010703 A1 * | 1/2020 | Wu | D21H 17/02 |
| 2020/0171461 A1 * | 6/2020 | Sakikawa | C09K 5/14 |
| 2022/0025238 A1 * | 1/2022 | Tang | C09K 5/063 |

FOREIGN PATENT DOCUMENTS

| | | | | |
|---|---|---|---|---|
| CN | 101050354 A | | 10/2007 | |
| CN | 101724381 A | | 6/2010 | |
| CN | 104745149 A | | 7/2015 | |
| CN | 104910868 A | | 9/2015 | |
| CN | 105289436 A | | 2/2016 | |
| CN | 105670569 A | * | 6/2016 | ............ B82Y 30/00 |
| EP | 3122335 A1 | * | 2/2017 | ......... B29C 65/4805 |

OTHER PUBLICATIONS

Zheng Lin et al., "Experimental study on improving stability of PCM and MEPCM slurry with different surfactants", International Journal of Low-Carbon Technologies, 2018, 13, 272-276. Published on line, Jul. 13, 2018. (Year: 2018).*
Lin Zheng et al., "Experimental Studies of Phase Change and Microencapsulated Phase Change Materials in a Cold Storage/Transportation System with Solar Driven Cooling Cycle", Energies, 2017, 10, 1867, 11 pages. Published Nov. 14, 2017. (Year: 2017).*
Wang, Ruzhu et al.; Green Building Energy System; Shanghai Jiaotong University Press, Oct. 2013; ISBN 978-7-313-10243-0; p. 190.

* cited by examiner

*Primary Examiner* — Douglas J McGinty
(74) *Attorney, Agent, or Firm* — Novick, Kim & Lee, PLLC; Allen Xue

(57) ABSTRACT

The present invention relates to the technical field of new materials, and relates to a thermal conduction enhanced organic composite shape-stabilized phase change material and a preparation method thereof. A thermal conduction enhanced organic composite shape-stabilized phase change material, which is composed of a coordination crosslinked network polymer, an organic solid-liquid phase change material and a thermal conduction enhancer, the mass percent are as follows: coordination crosslinked network polymer 1-50%, organic solid-liquid phase change material 40-98.9%, and thermal conduction enhancer 0.1-10%, the coordination crosslinked network polymer being formed by complexing of polymer compound with metal ions. The invention has simple synthesis process and convenient applications, the material having large enthalpy of phase change, excellent shape stabilizing effect, while the phenomenon of liquid leakage will not occur during operation. The material has broad application prospects in the field of thermal energy storage and management.

11 Claims, 4 Drawing Sheets

THERMAL CONDUCTION ENHANCED ORGANIC COMPOSITE SHAPE-STABILIZED PHASE CHANGE MATERIAL AND PREPARATION METHOD THEREOF

TECHNICAL FIELD

The present invention relates to a thermal conduction organic composite shape-stabilized phase change material and a preparation method thereof, belongs to the field of new material technology.

BACKGROUND ART

The phase change material (PCM) is to achieve energy storage and release through the absorption or release of a large amount of heat when a material changes phase. PCM has the advantages of high thermal storage density, small equipment volume, high thermal efficiency, and homothermal process of absorption and release, etc. It has good application prospects in solar energy utilization, industrial waste heat recovery and power load control, etc. Organic solid-liquid PCMs are favored by researchers because of not easy to appear supercooling and phase separation, low corrosion, stable performance and low toxicity, etc. However, this kind of materials have many deficiencies. In addition to serious liquid leakage, it has poor heat transfer performance and low heat storage utilization in practical applications due to its small heat conductivity coefficient, thereby limiting its applications.

In order to improve the heat storage and release efficiency of organic materials and expand their applications, it is necessary to perform study on the thermal conduction enhanced organic composite shape-stabilized PCMs.

SUMMARY OF THE INVENTION

In order to solve the problems existing in the prior art, the present invention provides a new thermal conduction enhanced organic composite shape-stabilized PCM and a preparation method thereof. The thermal conduction organic composite shape-stabilized PCM prepared in the invention has remarkably improved thermal conductivity, large enthalpy of phase change and excellent shape stabilizing effect, and has no liquid leakage during operation. With a simple synthesis process, this kind of material can be used in practical applications, having broad application prospects.

The present invention adopts the following technical solutions:

A thermal conduction enhanced organic composite shape-stabilized phase change material (PCM), wherein the composite shape-stabilized PCM is composed of a coordination crosslinked network polymer, an organic solid-liquid PCM and a thermal conduction enhancer according to the following mass percent:

the coordination crosslinked network polymer: 1-50%
the organic solid-liquid PCM: 40-98.9%
the thermal conductivity enhancer: 0.1-10%, wherein the coordination crosslinked network polymer being formed by complexing a polymer compound with metal ions.

In some implementations, the polymer compound is polyacrylic acid and sodium salt, potassium salt or ammonium salt thereof; polymaleic acid and sodium salt, potassium salt or ammonium salt thereof; carboxymethyl cellulose and sodium salt, potassium salt or ammonium salt thereof; sodium alginate, potassium alginate or ammonium alginate; carboxymethyl starch and sodium salt, potassium salt or ammonium salt thereof; polyvinyl alcohol; polyvinylpyrrolidone; polyvinyl pyridine; poly(acrylic acid-co-maleic acid) and sodium salt, potassium salt or ammonium salt thereof; poly(acrylic acid-co-methacrylic acid) and sodium salt, potassium salt or ammonium salt thereof; poly(methacrylic acid-co-maleic acid) and sodium salt, potassium salt or ammonium salt thereof; the molecular weight of the above polymer compound is 1000 to 9000000.

In the foregoing description, taking "polyacrylic acid and sodium salt, potassium salt or ammonium salt thereof" as an example, it means that the polymer compound may be polyacrylic acid, sodium polyacrylate, potassium polyacrylate or ammonium polyacrylate; and other similar expressions have the same meanings.

In some implementations, the metal ion is calcium ion, magnesium ion, ferrous ion, ferric ion, zinc ion, aluminum ion, divalent copper ion, barium ion, trivalent chromium ion, cobalt ion or silver ion.

In some implementations, the metal ion is provided by metal ionic compound, the metal ionic compound is chloride, oxide, nitrate, sulfate, acetate of calcium ion, magnesium ion, ferrous ion, ferric ion, zinc ion, aluminum ion, divalent copper ion, barium ion, trivalent chromium ion, cobalt ion or silver ion.

Further, the mass ratio of the metal ionic compound to the polymer compound is 1:100 to 30:100.

In some implementations, the organic solid-liquid PCM is at least one of paraffin, fatty acid, fatty alcohol, polyethylene glycol, and fatty acid ester.

In some implementations, the paraffin is a paraffin having a melting point of 8-60° C.; the fatty acid is one, two or three of decanoic acid, dodecanoic acid, tetradecanoic acid, pentadecanoic acid, palmitic acid, and stearic acid; the fatty alcohol is one, two or three of dodecanol, tetradecanol, hexadecanol, and octadecanol; the polyethylene glycol is a polyethylene glycol with a molecular weight of 200 to 20,000; the fatty acid ester is one, two or three of erythritol tetrastearate, erythritol tetrapalmitate, galactitol hexa palmitate, galactitol hexa stearic acid, glyceryl tristearate, glyceryl tripalmitate, glyceryl trimyristate, butyl stearate, soybean oil, corn oil, peanut oil, rapeseed oil, olive oil, castor oil.

In some implementations, the thermal conduction enhancer is one, two or three of graphene, graphene oxide, single-walled carbon nanotube, multi-walled carbon nanotube, boron nitride, carbon black, expanded graphite, nano-silver, nano-copper, nano-gold, aluminum, aluminum oxide, bismuth oxide, magnesium oxide, zinc oxide, aluminum nitride, bismuth nitride.

The present invention further provides a method for preparing the above organic composite shape-stabilized PCM, comprising the following steps:

preparing a homogeneous solution (with a mass fraction of 1% to 20%) by mixing the polymer compound and the solvent, adding the organic solid-liquid PCM and the thermal conduction enhancer into the above polymer solution and stirring at 20 to 80° C. for 1 to 10 h, then adding the metal ionic compound solution capable of providing the metal ion, drying it under vacuum for 24 h to obtain an organic composite shape-stabilized PCM.

In some implementations, the metal ionic compound is chloride, oxide, nitrate, sulfate, acetate of calcium ion, magnesium ion, ferrous ion, ferric ion, zinc ion, aluminum ion, divalent copper ion, barium ion, trivalent chromium ion, cobalt ion or silver ion, and the mass ratio thereof to the polymer compound is 1:100 to 30:100.

In some implementations, the solvent is one or two of water, benzene, toluene, DMF, DMSO, tetrahydrofuran, methanol, ethanol and acetone.

In some implementations, the concentration of the metal ionic compound solution is 0.05 mol/L.

Further, the thermal conduction enhancer is added to the reaction system in the form of a dispersion liquid thereof, in some implementations, the concentration of the solute in the dispersion liquid is 0.3 to 3 mg/g.

Beneficial Effect

The present invention provides a novel thermal conduction enhanced organic composite shape-stabilized PCM. The material has remarkably improved the thermal conduction, and has large enthalpy of phase change, excellent shape stabilizing effect, and has no liquid leakage during the operation.

With a simple synthesis process, the material can be used conveniently, having broad application prospects in the thermal energy storage and management.

DETAILED DESCRIPTION OF THE PREFERRED EMBODIMENTS

The following non-limiting embodiments are provided to enable those of ordinary skill in the art to fully understand the disclosure, but not to limit the disclosure in any way. In the following embodiments, unless otherwise stated, the experimental methods used are conventional methods; the reagents and materials are commercially available unless otherwise specified.

Embodiment 1

(1) Taking 0.3158 g of sodium alginate in a three-necked flask, add 20 mL of water, and stirring at 70° C. for 20 min to obtain a sodium alginate solution;

(2) Adding 6 g of PEG-6000 (the mass ratio of sodium alginate to polyethylene glycol is 5:95) and graphene aqueous dispersion (containing graphene 0.0064 g, the mass fraction of the thermal conduction enhancer of graphene in the material is 1%), stirring for 60 min, adding calcium chloride solution (0.05 mol/L) to form gel, to obtain composite calcium alginate gel;

(3) Drying the gel under vacuum at 40° C. for 24 h to obtain organic composite shape-stabilized PCM.

Figure 1:
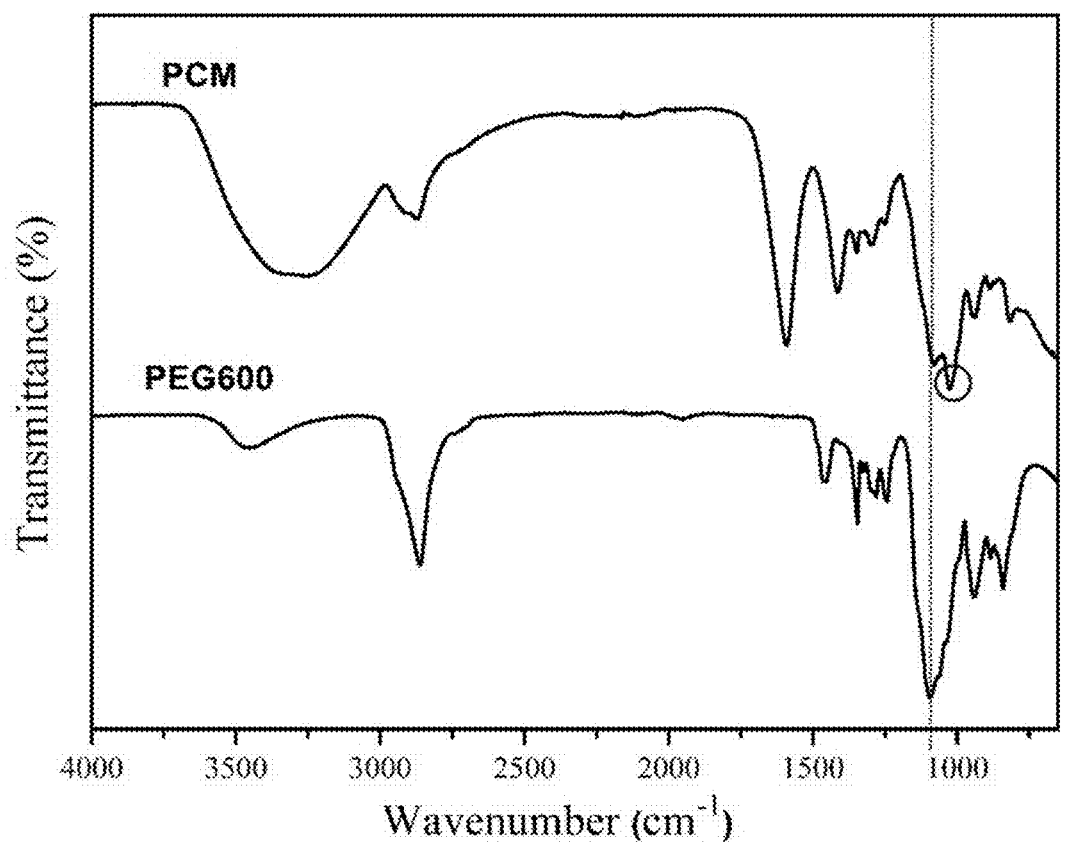
FIG. 1 is an infrared spectrum of the thermal conduction enhanced organic composite shape-stabilized PCM in Embodiment 1, wherein: a. pure polyethylene glycol, b. thermal conduction enhanced organic composite shape-stabilized PCM.
Figure 2:
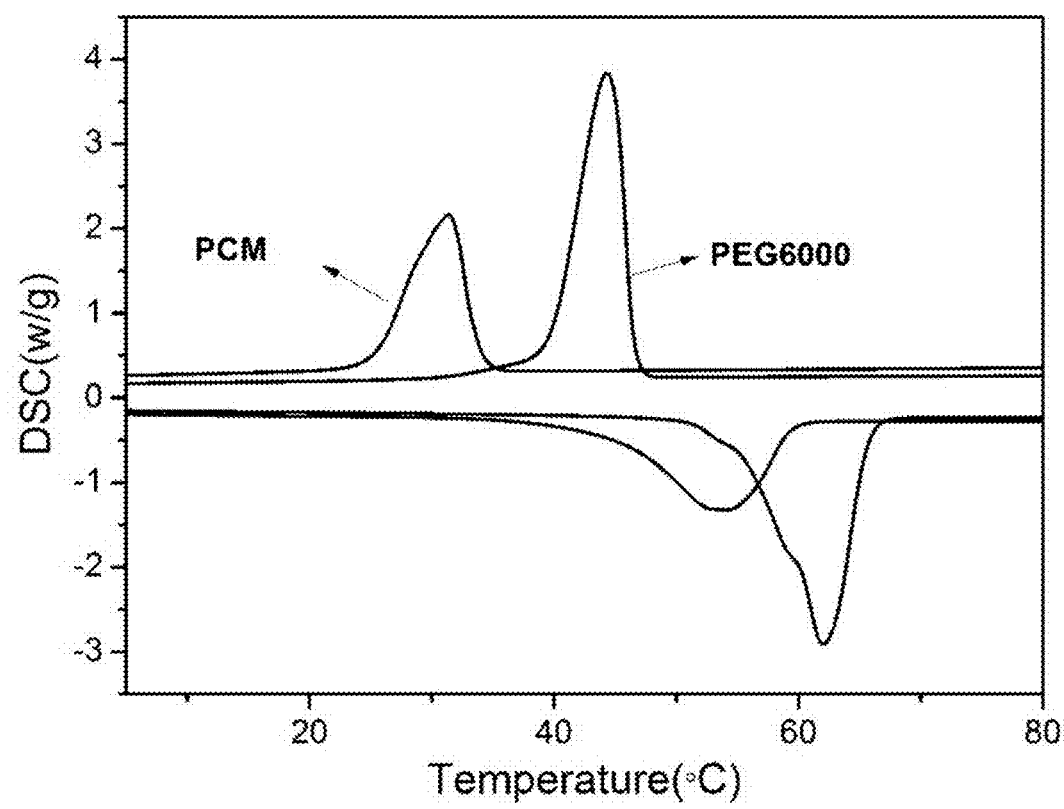
FIG. 2 is a DSC curve of the thermal conduction enhanced organic composite shape-stabilized PCM in Embodiment 1.
Figure 3:
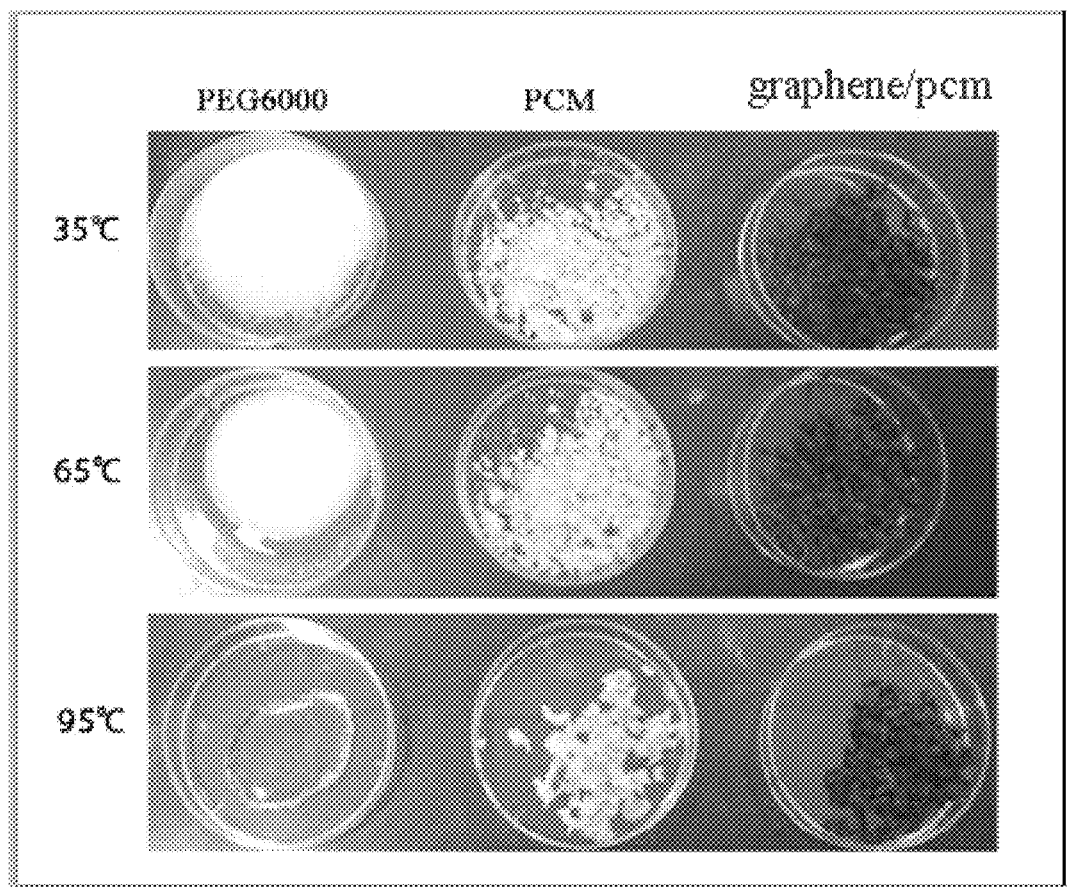
FIG. 3 is a photograph showing the shape stabilizing effect of the thermal conduction enhanced organic composite shape-stabilized PCM in Embodiment 1.
Figure 4:
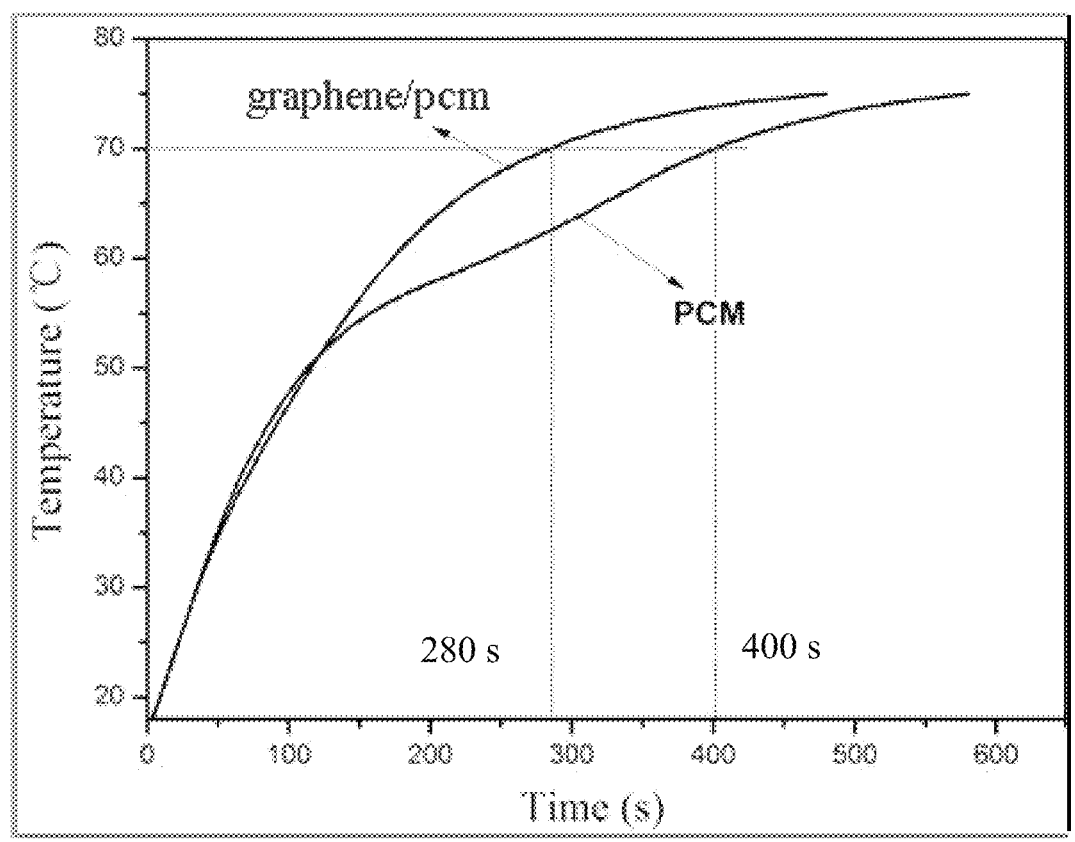
FIG. 4 is a temperature rise curve of the thermal conduction enhanced organic composite shape-stabilized PCM in Embodiment 1 and a blank material without adding a thermal conduction enhancer.

FIG. 1 is an infrared spectrum chart of the thermal conduction enhanced organic composite shape-stabilized PCM in Embodiment 1, wherein: a—pure polyethylene glycol, b—thermal conduction enhanced organic composite shape-stabilized PCM. As seen from the chart, by comparing the infrared peak of the composite material with polyethylene glycol, the C—O peaks occurring at 1026 $cm^{-1}$ is attributed to the C—O—Ca—O—C structure formed by the coordination and cross-linking of sodium alginate and Ca ion, proving the coordination of sodium alginate with calcium ions. The DSC curve of the thermal conduction enhanced organic composite shape-stabilized PCM is shown in FIG. 2. The enthalpy of phase change of pure polyethylene glycol is 203.0 J/g, and the enthalpy of phase change of the obtained material is 133.3 J/g, which still has a high enthalpy of phase change. The thermal conduction composite shape-stabilized PCM and PEG 6000 are placed on a heating table, the polyethylene glycol begins to melt at 65° C., and it is completely liquid at 95° C., while the blank material without adding thermal conduction enhancer and the thermal conduction enhanced composite shape-stabilized PCM have no obvious change in appearance, can maintain a stable shape, without liquid leakage (FIG. 3), indicating that the prepared thermal conduction enhanced composite shape-stabilized PCM has a good shape stabilizing effect. FIG. 4 is a temperature rise curve of the thermal conduction enhanced organic composite shape-stabilized PCM in Embodiment 1 and a blank material without adding a thermal conduction enhancer. As shown in FIG. 4, it takes 400 seconds for the blank material without adding graphene to heat to 70° C., while it only takes 280 seconds for the thermal conduction enhanced organic composite shape-stabilized PCM adding graphene, the thermal conduction is improved remarkably.

Embodiments 2-4

The mass ratio of sodium alginate to polyethylene glycol (Mn=6000) is respectively changed to 50:50, 25:75 and 10:90 to obtain the corresponding organic composite shape-stabilized PCMs, and other conditions are consistent with those in Embodiment 1. The test results show that the obtained thermal conduction enhanced organic composite shape-stabilized PCMs have good shape stabilizing effect.

Embodiments 5-9

Sodium polyacrylate, potassium polymaleate, polyvinyl pyridine, carboxymethylcellulose, and polyvinyl alcohol are used as the polymer materials to be coordinated, to obtain the corresponding thermal conduction enhanced organic composite shape-stabilized PCMs, and other conditions are consistent with those in Embodiment 1. The test results show that the obtained thermal conduction enhanced organic composite shape-stabilized PCMs have good shape stabilizing effect.

Embodiments 10-18

Magnesium chloride, ferrous chloride, ferric chloride, zinc sulfate, aluminum nitrate, copper sulfate, barium chloride, silver nitrate and chromium acetate are used as coordination metal ionic compounds to obtain the corresponding thermally conduction enhanced organic composite shape-stabilized PCMs, and other conditions are consistent with those in Embodiment 1. The test results show that the obtained thermal conduction enhanced organic composite shape-stabilized PCMs have good shape stabilizing effect.

Embodiments 19-21

Dodecanoic acid, palmitic acid and stearic acid are used as organic solid-liquid PCM respectively, to obtain the corresponding thermal conduction enhanced organic composite shape-stabilized PCMs, and other conditions are consistent with those in Embodiment 1. The test results show that the obtained thermal conduction enhanced organic composite shape-stabilized PCMs have good shape stabilizing effect.

Embodiments 22-25

Dodecanol, tetradecanol, hexadecanol and octadecanol are used as organic solid-liquid PCM respectively, to obtain the corresponding thermal conduction enhanced organic composite shape-stabilized PCMs, and other conditions are consistent with those in Embodiment 1. The test results show that the obtained thermal conduction enhanced organic composite shape-stabilized PCMs have good shape stabilizing effect.

Embodiments 26-31

Erythritol tetrastearate, galactitol hexa palmitate, glyceryl tristearate, glyceryl tripalmitate, soybean oil and olive oil are used as organic solid-liquid PCM respectively, DMF and water are mixed as solvent, to prepare polymer solution with mass fraction of 1%, to obtain the corresponding thermal conduction enhanced organic composite shape-stabilized PCMs, and other conditions are consistent with those in Embodiment 1. The test results show that the obtained thermal conduction enhanced organic composite shape-stabilized PCMs have good shape stabilizing effect.

Embodiments 32-47

Graphene oxide, single-walled carbon nanotube, multi-walled carbon nanotube, boron nitride, carbon black, expanded graphite, nano-silver, nano-copper, nano-gold, aluminum, aluminum oxide, bismuth oxide, magnesium oxide, zinc oxide, aluminum nitride, bismuth nitride are used as thermal conduction enhancer respectively, to obtain the corresponding thermal conduction enhanced organic composite shape-stabilized PCMs, and other conditions are consistent with those in Embodiment 1. The test results show that the obtained thermal conduction enhanced organic composite shape-stabilized PCMs have a good shape stabilizing effect.

Embodiments 48-53

The mass fraction of the thermal conduction enhancer is changed to 0.5%, 2%, 5%, 8% and 10% respectively, to obtain the corresponding thermal conduction enhanced organic composite shape-stabilized PCMs, and other conditions are consistent with those in Embodiment 1. The test results show that the obtained thermal conduction enhanced organic composite shape-stabilized PCMs have good shape stabilizing effect.

Embodiment 54

Vinyl pyridine is used as a coordination polymer, zinc sulfate is used as a coordination metal ionic compound, and 35° C. phase change paraffin is used as a solid-liquid PCM. The mass ratio of vinyl pyridine to phase change paraffin is 8:92, benzene and toluene are mixed as a solvent, and the mass fraction of vinyl pyridine in the polymer solution is 5%, to obtain the corresponding thermal conduction enhanced organic composite shape-stabilized PCM, and other conditions are consistent with those in Embodiment 1. The test results show that the obtained thermal conduction enhanced organic composite shape-stabilized PCM have a good shape stabilizing effect.

Embodiments 55-62

Erythritol tetrapalmitate, galactitol hexa stearic acid, glyceryl trimyristate, butyl stearate, corn oil, peanut oil, rapeseed oil and castor oil are used as solid-liquid phase change material respectively, to obtain the corresponding thermal conduction enhanced organic composite shape-stabilized PCMs, and other conditions are consistent with those in Embodiment 54. The test results show that the obtained thermal conduction enhanced organic composite shape-stabilized PCMs have good shape stabilizing effect.

The invention claimed is:

1. A composite phase change material, comprising:
a metal ion coordination polymer network, an organic solid-liquid phase change material supported on the metal ion coordination polymer network, and a thermal conduction enhancer, wherein:
a mass percent of the metal ion coordination polymer network is 1-50%,
a mass percent of the organic solid-liquid phase change material is 40-98.9%,
a mass percent of the thermal conduction enhancer is 0.1-10%, and
the metal ion coordination polymer network is crosslinked by coordination of a polymer compound to one or more metal ions.

2. The composite phase change material according to claim 1, wherein the polymer compound is selected from polyacrylic acid, polymaleic acid, carboxymethyl cellulose, sodium alginate, carboxymethyl starch, poly(acrylic acid-co-maleic acid), poly(acrylic acid-co-methacrylic acid), poly(methacrylic acid-co-maleic acid), sodium salts, potassium salts, and ammonium salts thereof, polyvinyl alcohol, polyvinylpyrrolidone, and polyvinyl pyridine.

3. The composite phase change material according to claim 1, wherein the one or more metal ions are selected from calcium ion, magnesium ion, ferrous ion, ferric ion, zinc ion, aluminum ion, divalent copper ion, barium ion, trivalent chromium ion, cobalt ion, and silver ion.

4. The composite phase change material according to claim 3, wherein the one or more metal ions are provided by one or more metal ionic compounds selected from chloride, oxide, nitrate, sulfate, and acetate of calcium ion, magnesium ion, ferrous ion, ferric ion, zinc ion, aluminum ion, divalent copper ion, barium ion, trivalent chromium ion, cobalt ion, and silver ion, and a mass ratio of the one or more metal ionic compounds to the polymer compound is 1:100 to 30:100.

5. The composite phase change material according to claim 1, wherein the organic solid-liquid phase change material is at least one selected from paraffin, fatty acid, fatty alcohol, polyethylene glycol, and fatty acid ester.

6. The composite phase change material according to claim 5, wherein the paraffin is a paraffin having a melting point of 8-60° C.; the fatty acid is selected from decanoic acid, dodecanoic acid, tetradecanoic acid, pentadecanoic acid, palmitic acid, stearic acid, and mixtures thereof; the fatty alcohol is selected from dodecanol, tetradecanol, hexadecanol, octadecanol, and mixtures thereof; the polyethylene glycol has a molecular weight of 200 to 20,000; the fatty acid ester is selected from erythritol tetrastearate, erythritol tetrapalmitate, galactitol hexa palmitate, galactitol hexa stearic acid, glyceryl tristearate, glyceryl tripalmitate, glyceryl trimyristate, butyl stearate, soybean oil, corn oil, peanut oil, rapeseed oil, olive oil, castor oil, and mixtures thereof.

7. The composite phase change material according to claim 1, wherein the thermal conduction enhancer is selected from graphene, graphene oxide, single-walled carbon nanotube, multi-walled carbon nanotube, boron nitride, carbon black, expanded graphite, nano-silver, nano-copper, nano-gold, aluminum, aluminum oxide, bismuth oxide, magnesium oxide, zinc oxide, aluminum nitride, bismuth nitride, and mixtures thereof.

8. A method for preparing a composite phase change material according to claim 1, comprising:
    preparing a first solution comprising the polymer compound and a solvent, a mass fraction of the polymer compound in the first solution being 1% to 20%;
    adding the organic solid-liquid phase change material and the thermal conduction enhancer into the first solution and stirring at 20 to 80° C. for 1 to 10 h to form a mixture; and
    adding a second solution containing the one or more metal ions into the mixture to form a product; and
    drying the product under vacuum to obtain the composite phase change material.

9. The method according to claim 8, wherein the one or more metal ions is from one or more selected from chloride, oxide, nitrate, sulfate, or acetate of calcium ion, magnesium ion, ferrous ion, ferric ion, zinc ion, aluminum ion, divalent copper ion, barium ion, trivalent chromium ion, cobalt ion, and silver ion, and a mass ratio between the one or more metal ions to the polymer compound is 1:100 to 30:100.

10. The method according to claim 8, wherein the solvent is selected from water, benzene, toluene, DMF, DMSO, tetrahydrofuran, methanol, ethanol, acetone, and mixtures thereof.

11. The composite phase change material according to claim 2, wherein the polymer compound has a molecular weight of 1000 to 9000000.

* * * * *